E. EUSTON.
PROCESS OF PRODUCING WHITE LEAD.
APPLICATION FILED DEC. 7, 1912.
1,079,481.
Patented Nov. 25, 1913.
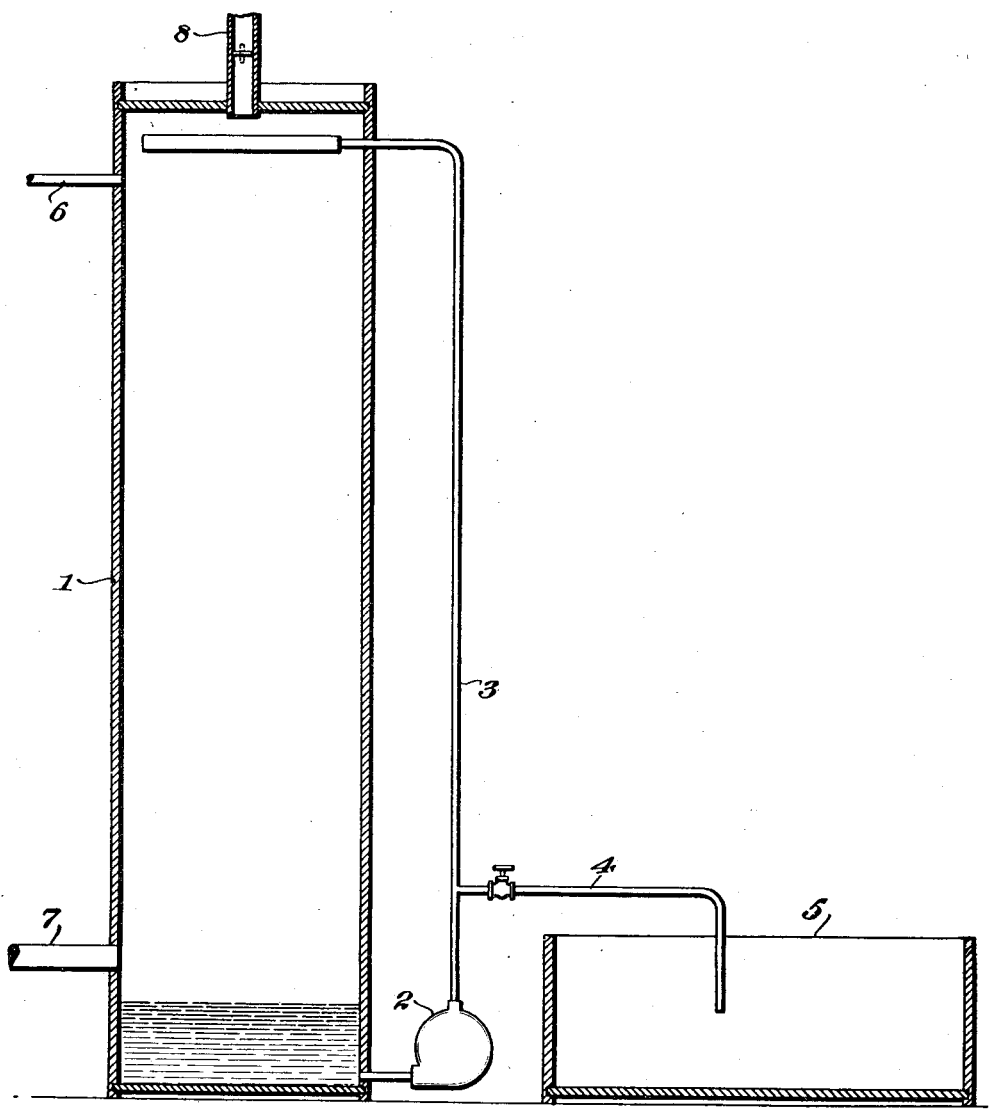
Witnesses:
Inventor,
Edwin Euston,

UNITED STATES PATENT OFFICE.

EDWIN EUSTON, OF ST. LOUIS, MISSOURI.

PROCESS OF PRODUCING WHITE LEAD.

1,079,481.  Specification of Letters Patent.  Patented Nov. 25, 1913.

Application filed December 7, 1912. Serial No. 735,505.

*To all whom it may concern:*

Be it known that I, EDWIN EUSTON, a citizen of the United States, residing at the city of St. Louis, State of Missouri, have invented a certain new and useful Improvement in Processes of Producing White Lead, of which the following is a full, clear, and exact description, such as will enable others skilled in the art to which it appertains to make and use the same, reference being had to the accompanying drawings, forming part of this specification, in which the figure is a diagrammatic view of a simple form of apparatus with which my improved method may be practised.

My invention relates to a process of producing white lead, the object of the invention being to produce, by a precipitation process which may be easily controlled and practised at a low cost, both as to plant and operating expenses, white lead which is at least fully equal in quality to the best white lead produced by the well known Old Dutch process.

The essential idea involved in my invention is that a basic solution of lead is subjected to the action of carbon dioxid (gaseous or in solution) in such governing environment of approximately neutral lead acetate solution as to maintain a lead solution of substantially neutral reaction.

The large number of efforts heretofore made to discover a method by which the so-called precipitation process could be caused to yield a commercially acceptable and profitable product have been directed toward the form of apparatus employed, the character and basicity of the lead solution forming each batch, the quantity of the carbon dioxid gas used in proportion to the total lead content of the solution, the temperature maintained, the specific gravity (strength of the lead solution), the use of pure or undiluted carbon dioxid gas at atmospheric or greater pressures, or the employment of solvents other than normal lead acetate for the precipitable portion of the lead solution. All of these attempts have been failures either because of expense of operation, lack of uniformity of product, or the failure to produce white lead of the requisite quality.

In the usual course of the precipitation process heretofore practised, basic carbonate of lead is precipitated by carbon dioxid from a lead solution, at first strongly basic and this precipitate which approximates the composition $PbCO_3,Pb(OH)_2$, has a decided tendency toward the colloidal state, thereby indicating molecules of considerable complexity, and has a high linseed oil requirement often as much as twenty-five (25%) per cent. to form a paste. During the continuance of this ordinary process of precipitation, succeeding samples show little change in composition from $PbCO_3,Pb(OH)_2$, but the oil requirement decreases gradually to about eleven (11%) per cent., when the solution becomes neutral and the formula changes to about $2PbCO_3,Pb(OH)_2$. By continuing the process still further than in the heretofore practised precipitation process, the precipitate eventually becomes almost non-hydrated, $PbCO_3$ of about seven (7%) per cent. oil requirement, at which point the reactions are complete. Since Old Dutch lead of the usual composition $2PbCO_3,Pb(OH)_2$ requires only eight (8%) per cent. of linseed oil, it is therefore seen that the defect of the usual precipitation process is in producing a lead of too high an oil requirement (11%), and the effort to reduce the oil requirement by prolonging the process and increasing the per cent. of lead carbonate results in loss of brushing quality and opacity. This defect is attributable apparently to the complex colloidal molecules caused by the high OH concentration in the originally strongly basic solution.

The method of producing white lead by a precipitation process presents advantages in economy and ease of operation and by my invention I am able to overcome the defects heretofore existing in practised precipitation processes and produce cheaply, rapidly and certainly white lead of quality fully equal in all respects to the best white lead now produced and free from the known defects of white lead produced by the Old Dutch process.

I have discovered that if the strongly alkaline condition of the basic lead acetate solution during precipitation, characteristic of the precipitation process hereto practised, is avoided by causing the precipitation to occur in a neutral or only faintly alkaline or acid environment, white lead of the composition and physical properties shown by the best Old Dutch process white lead can be produced without the necessity heretofore experienced of an excessive percentage of lead carbonate in order to insure sufficient density, to form with only about 8% of linseed oil, the white lead paste of commerce.

The avoidance of a strongly alkaline condition can be attained in several ways, such as; first, by using a relatively large quantity of approximately neutral lead acetate solution, as an environment in which the precipitation occurs, adding thereto properly apportioned quantities of carbon dioxid and of basic lead acetate solution of any desired degree of strength, at a rate sufficient to maintain the total volume of liquid under treatment at substantially the neutral point; or second, by alternately allowing the liquid in the foregoing treatment to become acid and then alkaline, as being a more easily practised factory method of determining the substantial uniformity of the fairly neutral average condition.

In practising my improved process, I prefer to use an apparatus substantially like that shown diagrammatically in the accompanying drawing and consisting of a tank 1 adapted to contain a constantly renewed atmosphere of carbon dioxid gas or a mixture of that and other diluting gases through which the solution passes. The tank is fitted with a suitable pump 2 for withdrawing the solution from the bottom of the tank and passing the same through the pipe 3 back into the tank at the top thereof, or for pumping the solution through a branch pipe 4 to a receiving tank 5. The tank is also provided with a solution inlet pipe 6 and with gas inlet and outlet pipes 7 and 8 respectively. The tank can be of any desired size or proportions, but I prefer a relatively tall tank of about five times the cubical capacity required for the amount of liquid to be handled at any one time. The shape and other details of this apparatus are not essential to the broad idea of my invention, and I do not limit myself to this form. I prefer to use a solution of acetate of lead about 5 to 10 degrees Baumé at the neutral point, and made basic to any desired practicable degree when used as the solution from which to form the precipitate. I do not limit myself to any particular strength of these solutions, which can be made in any of the recognized ways. The temperature, strength of gas, and relation to atmospheric pressure may be varied within wide limits, and are not essential to this process. The process may be worked intermittently or continuously according to preference.

In the apparatus just described, I carry on the process in either of the two ways described, or equivalents thereof, and treat the resulting precipitate in the usual manner by separating it from the containing solution and preparing it for the market either as dry white lead or as white lead in oil.

In the practice of my improved method, I am able, by the use of a neutral or only moderately alkaline or acid lead acetate solution, to prevent the precipitate from assuming the bulky form characteristic of the strongly basic lead acetate solution utilized in precipitating processes heretofore practised.

What I claim is:

The method of producing white lead consisting in treating approximately neutral lead acetate solution with carbon dioxid gas, and introducing therein basic lead acetate solution at a rate proportional to the precipitation of white lead.

In testimony whereof I hereunto affix my signature in the presence of two witnesses, this 3d day of December, 1912.

EDWIN EUSTON.

Witnesses:
  ALEXANDER EUSTON,
  M. P. SMITH.